No. 734,439. Patented July 21, 1903.

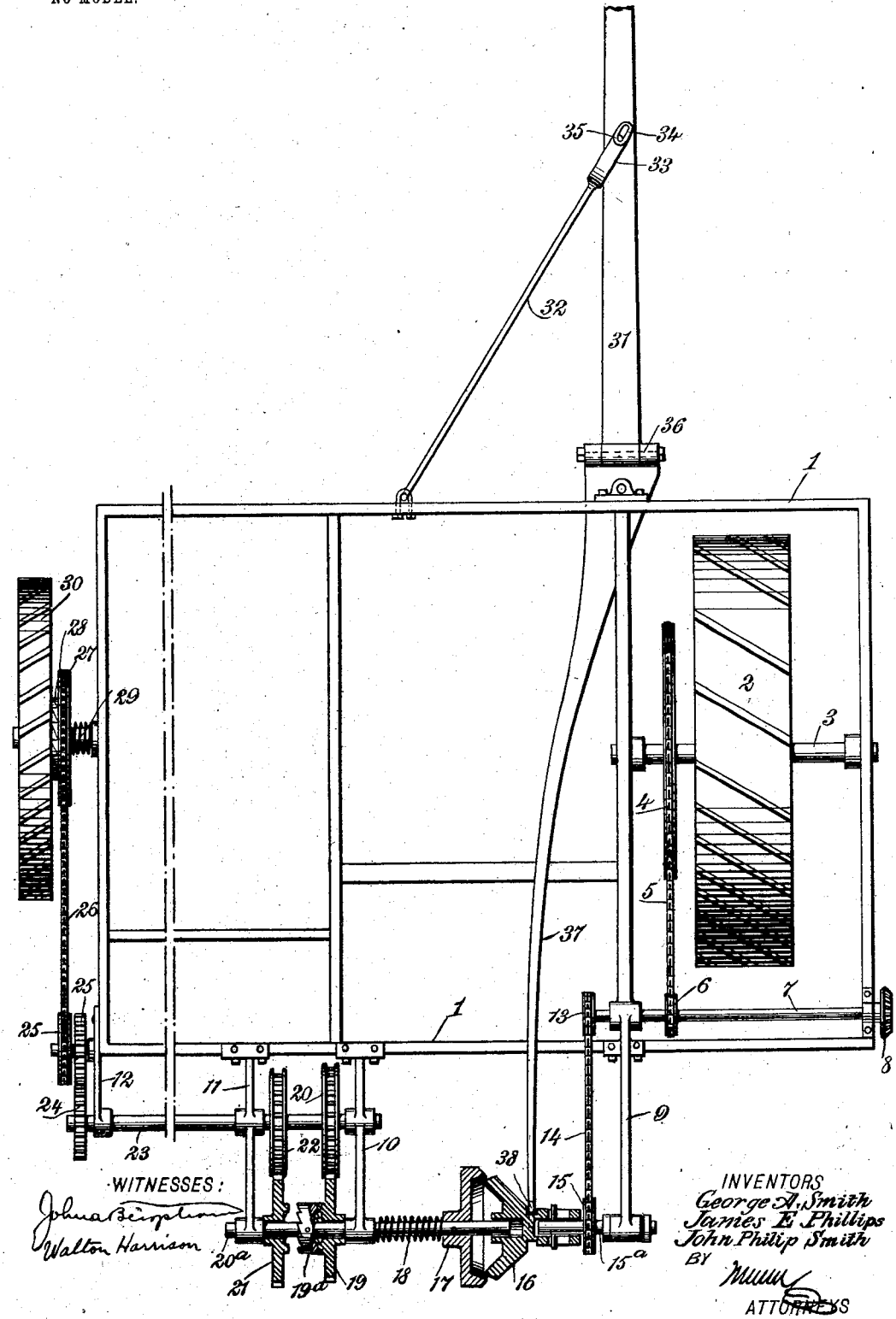

UNITED STATES PATENT OFFICE.

GEORGE A. SMITH, OF COTTONWOOD, JAMES E. PHILLIPS, OF MINNEAPOLIS, AND JOHN PHILIP SMITH, OF COTTONWOOD, MINNESOTA.

DEVICE FOR PREVENTING SIDE DRAFT IN HARVESTERS.

SPECIFICATION forming part of Letters Patent No. 734,439, dated July 21, 1903.

Application filed March 25, 1902. Serial No. 99,889. (No model.)

*To all whom it may concern:*

Be it known that we, GEORGE A. SMITH, a resident of Cottonwood, in the county of Lyon, JAMES E. PHILLIPS, a resident of Minneapolis, in the county of Hennepin, and JOHN PHILIP SMITH, a resident of Cottonwood, in the county of Lyon, State of Minnesota, all citizens of the United States, have invented certain new and useful Improvements in Devices for Preventing Side Draft in Harvesters, of which the following is a full, clear, and exact description.

Our invention relates to harvesting-machines—such as reapers, mowers, and binders—the object being to relieve the so-called "side draft"—that is, the tendency of the machine to draw sidewise when pulled by horses, and so increase the work of dragging the machine forward. It will be noted that in harvesting-machines of this kind some part of the frame projects laterally outward, and it is this part which usually carries the operative mechanism. The horses are compelled to pull somewhat at a disadvantage on this account. Our idea is to quicken the speed of the part of the frame in question, and in order to do this we drive the grain-wheel by means of a train of gearing, but at the same time leave the wheel free to overrun its connections.

Reference is to be had to the accompanying drawing, forming part of this specification, in which the figure represents a plan view of our device.

The main frame is shown at 1, the master-gear at 2, and the axle for supporting the same at 3. Upon this axle is a front sprocket-wheel 4, connected by means of a sprocket-chain 5 with a rear sprocket-wheel 6, mounted upon a shaft 7. The bevel-gear 8 upon this shaft is used for actuating the cutting mechanism. (Not shown.) Brackets 9 10 11 12 support parts of the gearing. Upon the shaft 7 is mounted another sprocket-wheel 13, connected by a chain 14 with the sprocket-wheel 15, mounted upon a shaft $15^a$. Upon this shaft is also loosely keyed a clutch member 16, which engages a clutch member 17, mating the same, a spring 18 normally pressing the clutch member 17 to the right. Spur-gears 19 21 engage wheels 20 22, respectively, mounted on a shaft $20^a$, so as to constitute a changeable-speed gear. The wheel 19 is smaller than the wheel 21, and the wheel 22 is smaller than the wheel 20. A clutch $19^a$ is mounted rigidly upon the shaft $20^a$ and is free to engage either the wheel 19 or the wheel 21, as the case may be, according as said shaft $20^a$ is driven to the left by the clutch member 17 or is retracted to the right by means of the spring 18. The spring 18 normally keeps the clutch $19^a$ in mesh with the spur-gear 19. By means of gear-wheels 24 25, a sprocket-chain 26, and a sprocket-wheel 27 motion is communicated to the one-way clutch 28. This clutch is normally closed by the spring 29, so that when the speed of the chain 26 is greater than the normal speed of the sprocket-wheel 27 the speed of the grain-wheel 30 is quickened, whereas if the speed of the gearing be less than that of the grain-wheel the grain-wheel merely overruns the speed of the gearing. By this arrangement when the power from the master-wheel is transmitted through the wheels 19 and 20 the speed of the grain-wheel 30 is slower than when the power is transmitted through the wheels 21 22.

The tongue of the harvesting-machine is shown at 31. A link 32 is flexibly connected with the frame 1 and is provided with a horseshoe-shaped collar 33, provided with slots 34, which loosely engage a pin 35, so as to allow the left-hand portion of the frame 1 to swing backward slightly. The tongue 31 is pivoted at 36 and has the usual up-and-down radial motion. A spring-tongue 37 projects backward and terminates in a crescent 38, which engages the clutch member 16. When the left-hand portion of the frame is pulled backward by the draft, therefore, the spring-tongue 37 moves to the left, pressing the clutch member 16 into engagement with the clutch member 17 and throwing the clutch $19^a$ out of engagement with the wheel 19 and into engagement with the wheel 21. The effect of this movement is that the grain-wheel 30 considered as a driven element is quickened in speed. If, however, for any reason, such as the horses turning a bend, the speed of the grain-wheel considered as a vehicular member is increased beyond its speed considered as a member driven by the gearing, the clutch 28 allows it to overrun the speed of the gearing and to rotate practically as freely as is the case in the old machines. It will be noted, therefore, that while the wheel 30 is always free to act as an ordinary grain-wheel whenever such action may be necessary, yet during the moments when the machine is subjected to heavy draft the speed of this wheel is quickened by means of the gearing. When the quickening speed of the grain-wheel causes the left-hand portion of the frame to move forward, so as to lighten the draft caused by the grain upon this wheel, or, in other words, when the frame is restored to its normal position relatively to the tongue, the grain-wheel again acts as the grain-wheel of an ordinary harvesting-machine. Most of the time the wheel 19 is in use and the wheel 21 is idle. As frequent movements of the clutch $19^a$ would cause frequent shocks to the mechanism, the clutch, consisting of the members 16 and 17, is employed as an equalizer and also as a safety appliance to prevent breakage. When the machine is moving forward, say, with the wheel 19 in action, the least turn of the team to the right throws the clutch member 16 into engagement with its mate 17, which not only allows enough slip for purposes of safety, but shifts the shaft $20^a$ and clutch $19^a$ to the left, thus speeding up the train of gearing and giving the grain-wheel a higher rotary speed. The clutch 16 17, therefore, under ordinary circumstances exerts a regulating influence. This clutch is sensitive to the slightest variation in the general direction of travel, or, what amounts to about the same thing, to the speed of the grain-wheel 30. Practically as soon as the grain-wheel 30 begins to travel at a rate below its normal speed the slow wheel 19 is discarded automatically and the grain-wheel 30 is speeded up by the wheel 21. The speed of the grain-wheel 30 when driven through the agency of the wheels 19 and 20 is slightly greater than the speed of the master-wheel 2, the clutch 16 17 being the equalizing element, as above stated. When the team turns to the left or when from any other cause there is a tendency for the grain-wheel 30 to turn slowly as compared with the general speed of the machine, the clutch members 16 17 are disconnected and the entire train of mechanism thrown out of gear. The clutch $19^a$ still engages the wheel 19, however, so that when the clutch member 16 again engages the clutch member 17 the train of gearing is instantly completed.

Having thus described our invention, we claim as new and desire to secure by Letters Patent—

1. A device for preventing side draft in harvesters, comprising a frame, a master-wheel and a grain-wheel, both for engaging the ground and normally connected together by differential-speed gearing, and means controllable by the forward draft of the harvester for automatically changing the speed of said gearing.

2. A device for preventing side draft in harvesters, comprising a frame, a master-wheel and a grain-wheel, both for engaging the ground, and normally connected together by fragmentary trains of gearing, clutch mechanism for changing the speed of one of said fragmentary trains of gearing, and a draft appliance for automatically actuating said clutch mechanism.

3. A device for preventing side draft in harvesters, comprising a frame, a master-wheel for engaging the ground, differential-speed gear connected with said master-wheel and controllable automatically by the forward draft of the harvester, a grain-wheel for engaging the ground, and a one-way clutch connected with said grain-wheel and with said gearing, said clutch being driven by said gearing, the arrangement being such that said gearing when driven at maximum speed is free to be overrun by said grain-wheel.

4. A device for preventing side draft in harvesters, comprising a frame, a master-wheel for engaging the ground, gearing permanently connected with said master-wheel and driven thereby, a grain-wheel for engaging the ground and provided with a one-way clutch, gearing connected with said clutch, mechanism for connecting said gearings together for producing different speeds, and a spring member controlled by the tension of the forward draft for actuating said clutch members.

In testimony whereof we have signed our names to this specification in the presence of the subscribing witnesses.

GEORGE A. SMITH.
JAMES E. PHILLIPS.
JOHN PHILIP SMITH.

Witnesses as to the signature of George A. Smith:
ALEX. H. LAME,
G. A. STRAND.

Witnesses as to the signatures of James E. Phillips and John Philip Smith:
W. GEO. HAMMETT,
A. P. JOHNSON.